(12) United States Patent
Økland

(10) Patent No.: US 11,964,747 B2
(45) Date of Patent: Apr. 23, 2024

(54) FULLY INTEGRATED HYBRID POWER GENERATION SYSTEM FOR A VESSEL

(71) Applicant: Trygve Johannes Økland, Toransvåg (NO)

(72) Inventor: Trygve Johannes Økland, Toransvåg (NO)

(*) Notice: Subject to any disclaimer, the term of this patent is extended or adjusted under 35 U.S.C. 154(b) by 1061 days.

(21) Appl. No.: 16/783,834

(22) Filed: Feb. 6, 2020

(65) Prior Publication Data
US 2021/0245854 A1   Aug. 12, 2021

(51) Int. Cl.
| | | |
|---|---|---|
| B63H 21/20 | (2006.01) | |
| B60W 10/26 | (2006.01) | |
| B60W 20/13 | (2016.01) | |
| B63H 21/21 | (2006.01) | |

(52) U.S. Cl.
CPC ............ B63H 21/20 (2013.01); B60W 10/26 (2013.01); B60W 20/13 (2016.01); B63H 21/21 (2013.01); *B63H 2021/205* (2013.01); *B63H 2021/216* (2013.01)

(58) Field of Classification Search
None
See application file for complete search history.

(56) References Cited

U.S. PATENT DOCUMENTS

| | | |
|---|---|---|
| 7,803,024 B2 | 9/2010 | Su |
| 8,062,081 B2 | 11/2011 | Barrett et al. |
| 8,118,627 B2 | 2/2012 | Wejrzanowski et al. |
| 8,164,306 B2 | 4/2012 | Mizushima et al. |
| 8,373,949 B2 | 2/2013 | Bourgeau |
| 8,706,330 B2 | 4/2014 | Caouette |

(Continued)

FOREIGN PATENT DOCUMENTS

| | | |
|---|---|---|
| CN | 104037927 B | 2/2017 |
| DE | 102016112288 A1 | 1/2017 |

(Continued)

OTHER PUBLICATIONS

International Search Report and Written Opinion of the ISA issued in connection with PCT Application No. PCT/IB2020/001101, dated Jul. 23, 2021, pp. 1-12.

(Continued)

*Primary Examiner* — Lail A Kleinman
(74) *Attorney, Agent, or Firm* — Hoffmann & Baron, LLP

(57) ABSTRACT

A method is provided for enhancing fuel efficiency in an integrated hybrid power system for a marine vessel, the integrated hybrid power system including multiple energy storage units and at least one engine-driven power generator coupled with a power distribution grid. The method includes: determining whether a consumer load on the power distribution grid is greater than a rated maximum efficiency loading of the power generator; starting the power generator when the consumer load is greater than the maximum efficiency loading and/or a charge level of the energy storage units is below a lower threshold value; maintaining a constant load on the power generator equal to the maximum efficiency loading despite fluctuations in consumer load; and shutting down the power generator when the consumer load is less than or equal to the maximum efficiency loading and the charge level of the energy storage units is greater than or equal to the lower threshold value.

19 Claims, 9 Drawing Sheets

(56) References Cited

U.S. PATENT DOCUMENTS

| | | | |
|---|---|---|---|
| 8,725,329 B1 | 5/2014 | Snyder et al. | |
| 8,926,381 B2 | 1/2015 | Haugland | |
| 9,550,556 B2 | 1/2017 | Kennedy | |
| 10,046,651 B2 | 8/2018 | Lin et al. | |
| 10,170,912 B2 | 1/2019 | Mathiesen et al. | |
| 2005/0287880 A1 | 12/2005 | Okuyama | |
| 2009/0156068 A1 | 6/2009 | Barrett et al. | |
| 2010/0094490 A1* | 4/2010 | Alston | B63J 3/02 290/40 C |
| 2010/0144219 A1 | 6/2010 | Balogh et al. | |
| 2012/0083173 A1 | 4/2012 | McMillan | |
| 2016/0268831 A1 | 9/2016 | Spooner et al. | |
| 2017/0141671 A1 | 5/2017 | Stubbings et al. | |
| 2017/0256957 A1 | 9/2017 | Buiel et al. | |
| 2018/0062388 A1* | 3/2018 | Mathiesen | H02J 3/28 |
| 2018/0159330 A1 | 6/2018 | Kang | |
| 2019/0140454 A1 | 5/2019 | Chase et al. | |
| 2020/0079204 A1* | 3/2020 | Matsuda | H02K 7/1815 |
| 2022/0177102 A1* | 6/2022 | Nydahl | B63H 21/20 |
| 2022/0239136 A1* | 7/2022 | Fasching | H02M 7/49 |

FOREIGN PATENT DOCUMENTS

| | | |
|---|---|---|
| EP | 3203601 A1 | 8/2017 |
| EP | 3412558 A1 | 12/2018 |
| WO | 2008130968 A1 | 10/2008 |
| WO | 2009067722 A1 | 5/2009 |
| WO | 2012175624 A1 | 12/2012 |
| WO | 2016150815 A1 | 9/2016 |
| WO | 2019180323 A1 | 9/2019 |

OTHER PUBLICATIONS

Kim et al., "A Naval Integrated Power System with a Battery Energy Storage System: Fuel efficiency, reliability, and quality of power", IEEE Electrification Magazine, vol. 3, No. 2, 2015 (https://ieeexplore.ieee.org/abstract/document/5729211.

Tang et al., "On the feasibility of hybrid Battery/Ultracapacitor Energy Storage Systems for next generation shipboard power systems," 2010 IEEE Vehicle Power and Propulsion Conference, 2010 (http://ieeexplore.ieee.org/abstract/document/7116689.

* cited by examiner

FULLY INTEGRATED HYBRID POWER GENERATION SYSTEM FOR A VESSEL

BACKGROUND

The present invention relates generally to the electrical, electronic and computer arts, and, more particularly, to power management apparatus, systems and methods for a vessel.

Modern marine vessels predominantly employ diesel-electric power systems, purporting that the propulsion means (e.g., thrusters) of the vessel are driven electrically with power provided by diesel or gasoline driven generator sets, often referred to as "gen sets." Some alternatives to diesel or gasoline driven gen sets include fuel cells, dual-fuel engines, gas turbines and the like. Most marine vessels further utilize at least two control systems; a first control system that regulates specified parameters on the power plant network or grid, and a second control system that regulates the motion of the vessel.

Dynamic positioning (DP) is a method of maintaining the position and heading of a marine vessel, generally by controlling the propulsion means of the vessel. Vessels that utilize DP include, for example, monohull offshore support vessels, semi-submersible rigs and drill ships. In a typical DP scenario, the DP system uses thrusters, which are considered auxiliary power units, or other vessel propulsion means in order to maintain balance against dynamic changes in the vessel's position and angle over time. However, since use of the thrusters in connection with the DP operation of the vessel is intended to cope with dynamic changes in the unspecified position and angle of the vessel, it can cause momentary fluctuations in the load consumed or generated in the vessel. In order to cope with such momentary fluctuations in load, generators in the vessel must have a sufficient margin for the instantaneous load that can be supplied.

In addition to having a sufficient margin to meet the instantaneous load that must be supplied by the generators, offshore DP vessels are often required to operate with extra redundancy, even in a split bus power grid configuration. For example, some vessels are designed with at least two running generators in each split during DP operations, to thereby minimize the risk of a partial blackout within a given split. Thus, in order to cope with momentary load fluctuations and redundancy requirements, a generator should maintain a power generation state in which it supplies a relatively low load compared to its rated capacity, and consequently this can result in a substantial reduction in fuel efficiency of the generator and incomplete combustion in the engine, all of which have an impact on cost and reliability of the vessel power generation system.

It is known to design a power generation system for a vessel that utilizes high-capacity batteries connected to the power grid. The batteries work in conjunction with the generator(s) to reduce the headroom requirements of the generators and to provide additional redundancy. However, conventional approaches to managing power generation and distribution in a vessel provide only minimal benefit and/or are only applicable in limited operational environments.

SUMMARY

The present invention, as manifested in one or more embodiments, beneficially provides an apparatus and method for enhancing fuel efficiency and reliability in a power generation and distribution system for a marine vessel, among other benefits. In one or more embodiments, mechanisms are provided for optimizing utilization of the generators in a fully integrated hybrid power generation system in a manner which minimizes operational costs and meets offshore redundancy criteria without compromising vessel control, particularly for a dynamically positioned marine vessel.

In accordance with an embodiment of the invention, a method is provided for enhancing fuel efficiency and reliability in an integrated hybrid power system for a marine vessel, the integrated hybrid power system including a plurality of energy storage units and at least one engine-driven power generator coupled with a power distribution grid. The method includes: determining whether a consumer load on the power distribution grid is greater than a prescribed rated maximum efficiency loading of the power generator; starting the power generator when the consumer load on the power distribution grid is greater than the prescribed rated maximum efficiency loading of the power generator and/or a charge level of the energy storage units is below a prescribed lower threshold value; maintaining a load on the power generator at a substantially constant load equal to the rated maximum efficiency loading of the power generator despite fluctuations in consumer load on the power distribution grid when the consumer load on the power distribution grid is greater than the rated maximum efficiency loading of the power generator; and shutting down the power generator when the consumer load on the power distribution grid is less than or equal to the rated maximum efficiency loading of the power generator and the charge level of the energy storage units is greater than or equal to the prescribed lower threshold value.

In accordance with another embodiment of the invention, an energy management system for use in an integrated hybrid power system for a marine vessel is provided, the integrated hybrid power system including multiple energy storage units and at least one engine-driven power generator coupled with a power distribution grid. The energy management system includes memory and at least one processor coupled with the memory and the plurality of energy storage units. The processor is configured: to determine whether a consumer load on the power distribution grid is greater than a prescribed rated maximum efficiency loading of the power generator; to start the power generator when: (i) the consumer load on the power distribution grid is greater than the prescribed rated maximum efficiency loading of the at least one power generator; and/or (ii) a charge level of the energy storage units is below a prescribed lower threshold value; to maintain a substantially constant load on the power generator equal to the prescribed rated maximum efficiency loading of the power generator despite fluctuations in consumer load on the power distribution grid when the consumer load on the power distribution grid is greater than the prescribed rated maximum efficiency loading of the power generator; and to shut down the power generator when the consumer load on the power distribution grid is less than or equal to the prescribed rated maximum efficiency loading of the power generator and the charge level of the energy storage units is greater than or equal to the prescribed lower threshold value.

In accordance with yet another embodiment of the invention, an integrated hybrid power system for use in a marine vessel includes a power distribution grid including at least first and second bus segments selectively coupled together, at least first and second energy storage units selectively coupled with the first and second bus segments, respectively, at least one engine-drive power generator selectively coupled with power distribution grid, and at least first and second power management systems associated with the first and second bus segments, respectively. Each of the power management systems includes a controller and one or more sensors coupled with the controller. The sensors in each of the power management systems are configured to monitor a consumer load on the corresponding bus segment. The controller in each of the power management systems is configured to control one or more operational parameters of the integrated hybrid power system as a function of information obtained from the sensors.

The integrated hybrid power system further includes an energy management system coupled with the first and second power management systems, the energy management system including at least one processor and memory coupled with the processor. The energy management system is configured to control synchronization of the bus segments and prescribed operations of the power management systems to thereby maintain a substantially constant load on the at least one power generator equal to a prescribed rated maximum efficiency loading of the power generator despite fluctuations in consumer load on the power distribution grid.

As may be used herein, "facilitating" an action includes performing the action, making the action easier, helping to carry the action out, or causing the action to be performed. Thus, by way of example only and without limitation, steps performed by one entity might facilitate an action carried out by another entity to cause or aid the desired action(s) to be performed. For the avoidance of doubt, where an actor facilitates an action by other than performing the action, the action is nevertheless performed by some other entity or combination of entities.

Techniques of the present invention can provide substantial beneficial technical effects. By way of example only and without limitation, apparatus and/or methods of generating and distributing power in a vessel according to embodiments of the invention may provide one or more of the following advantages:
- maintains the load on engine-driven power generators in an integrated hybrid power system at a prescribed rated maximum efficiency loading, despite fluctuations in consumer load in the power system, to thereby improve fuel efficiency and reliability in the power system;
- provides autonomous control over starting and stopping of power generators in the integrated hybrid power system based on at least one of prescribed operating criteria and hard limits associated with the power generators;
- optimizes fuel efficiency and reliability of the integrated hybrid power system without restricting control over or limiting the vessel's ability to implement dynamic positioning;
- provides a higher exhaust temperature of the engines due to complete combustion during high engine loading, thereby lowering the need for chemical treatment in exhaust scrubbers and/or catalyzer systems;
- reduces the running hours on the engines and increases productivity;
- reduces the running of auxiliary system units, thereby reducing power consumption;
- provides power regeneration, whereby the system is able to absorb large and constant power regeneration from the consumer side of the system, either from deck equipment such as cranes, winches or other equipment that can transform kinetic energy into electrical power;
- removes the need for auxiliary power generators and harbor generators.

These and other features and advantages of the present invention will become apparent from the following detailed description of illustrative embodiments thereof, which is to be read in connection with the accompanying drawings.

BRIEF DESCRIPTION OF THE DRAWINGS

Non-limiting and non-exhaustive embodiments of the present invention will be described with reference to the following drawings which are presented by way of example only, wherein like reference numerals (when used) indicate corresponding elements throughout the several views unless otherwise specified, and wherein.

Figure 1:
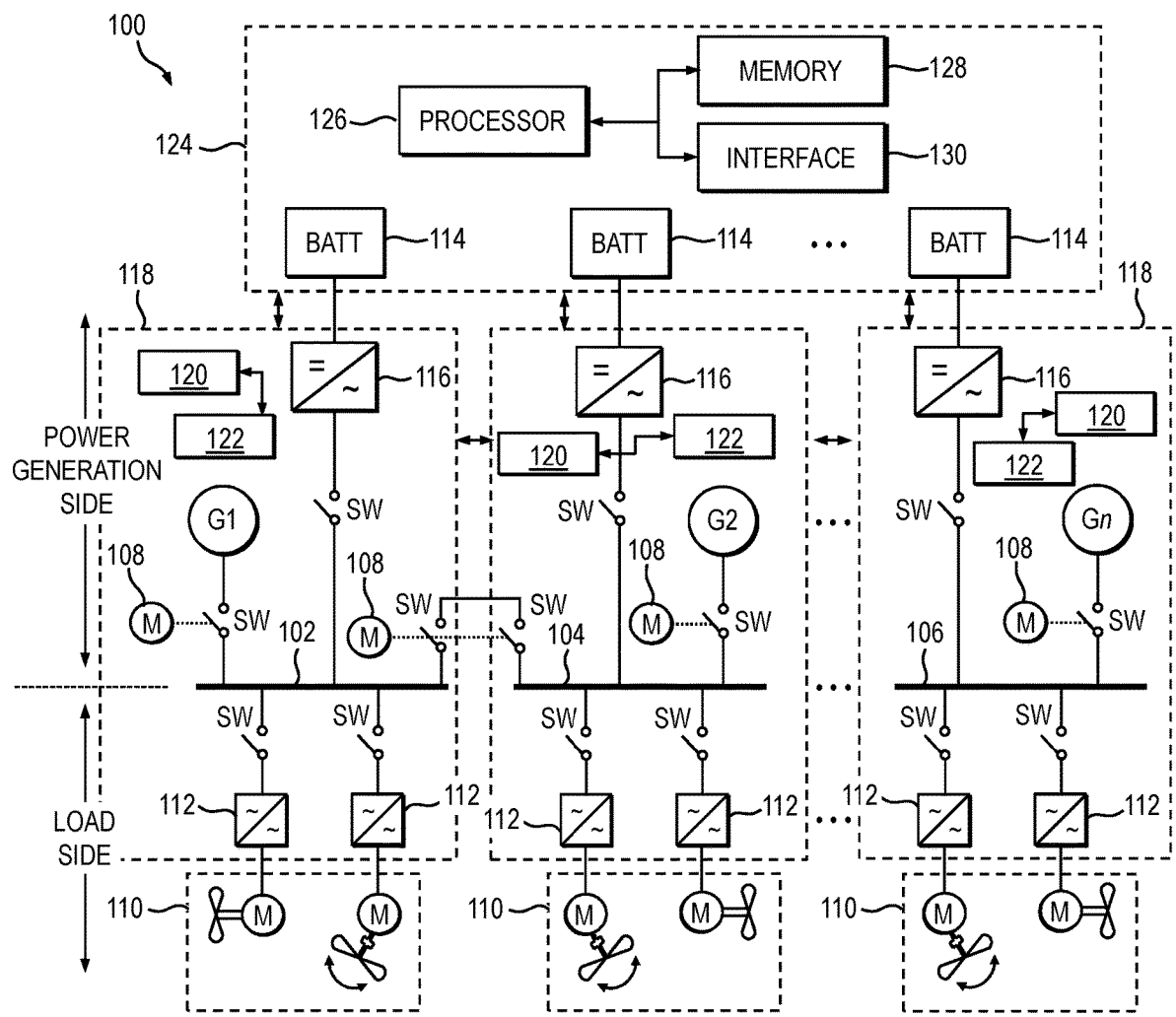
FIG. 1 is a block diagram depicting at least a portion of an exemplary fully integrated hybrid power system suitable for use on a marine vessel, according to an embodiment of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention, as manifested in one or more embodiments thereof, will be described herein in the context of illustrative apparatus and methods for enhancing fuel efficiency and reliability in a power generation system for a marine vessel, which has beneficial application, for example, in a dynamic positioning (DP) environment. It is to be appreciated, however, that the invention is not limited to the specific apparatus, systems and/or methods illustratively shown and described herein. Moreover, applications of embodiments of the present invention are not limited to DP marine vessels. Rather, it will become apparent to those skilled in the relevant art given the teachings herein that numerous modifications can be made to the embodiments shown that are within the scope of the claimed invention. That is, no limitations with respect to the embodiments shown and described herein are intended or should be inferred.

As previously stated, in power generation systems for marine vessels, particularly offshore vessels used for DP operations, the on-board power generation system is traditionally over-dimensioned in order to cope with momentary load fluctuations and redundancy requirements. In highly redundant systems like those found in DP vessels, there is a need for spinning reserve in the system in the event of a failure. The term "spinning reserve" as used herein refers generally to the amount of unused capacity in the power generation system assets (i.e., generators) which can compensate for power shortages or frequency drops within a given period of time. Traditionally, in a mechanical spinning reserve approach, if a generator in the power system is tripped, the remaining generators must be able to sustain the current system loading. And as such, the spinning reserve in the system must be equal to or larger than the potential power loss of the largest power contributor.

The power generation system typically places this spinning reserve on the power generation engines themselves, basically restricting at least some engines in the system to operate well below their rated output value (e.g., 50% or less) to be able to provide sufficient power for unexpected demand or contingencies. Operation of the engines at such a low load, however, results in reduced fuel efficiency, incomplete combustion in the engine, increased carbon dioxide and other emissions, and increased running hours of the machinery, among other disadvantages. These factors can have a significant negative impact on the operational cost and/or reliability of the power generation system.

In an attempt to reduce the cost of operation, some power generation systems incorporate a hybrid design which utilizes batteries connected to the main power grid. When utilized in a peak shaving application, the batteries are used to supplement smaller variations in the load. Using this approach, the generators can be operated at a more constant load, with the batteries handling the smaller variations in the consumer load. Thus, the hybrid power generation system is able to maintain smaller momentary power fluctuations in the system, but is not able to provide any substantial spinning reserve to the system. Consequently, traditional hybrid power systems provide only negligible benefits to the system with regard to loading of the engines.

FIG. 1 is a block diagram depicting at least a portion of an exemplary integrated hybrid power system 100 suitable for use on a marine vessel, according to an embodiment of the invention. The hybrid power system 100 includes a power distribution network or grid comprising a plurality of power bus segments 102, 104 and 106. The bus segments 102, 104, 106 are preferably selectively connected together by way of corresponding switches (SW), each of which is operated either automatically, using a corresponding control motor (M) 108 or other actuating device, or manually. In this manner, each of the bus segments 102, 104, 106 can be isolated from one another in the event of a failure of a component coupled to a given bus segment. It is to be appreciated that embodiments of the invention are not limited to any specific number of bus segments.

On a power generation side of the power distribution grid, the hybrid power system 100 includes a plurality of engine-driven power generators, G1 through Gn, where n is an integer greater than one. Each of the bus segments includes at least one generator selectively coupled thereto by way of a corresponding switch (SW), which, like the switches connecting the plurality of bus segments 102, 104, 106, can be operated either automatically, using a corresponding motor (M) 108 or other actuating device, or manually. Although not explicitly shown, each generator is driven by an engine, which together with an integrated engine control unit form a gen-set.

On a load side of the power distribution grid, the hybrid power system 100 includes a plurality of load components. In this embodiment, the load components comprise thruster control systems 110, although a load component is broadly intended to refer to any component that utilizes power from the power distribution grid. Each thruster control system, in this example, includes a pair of thrusters, which may be implemented as a combination of a propeller or screw driven by a corresponding electric motor (M). For example, the thrusters may be bow thrusters located at the bow of the vessel to provide propulsion in a direction perpendicular to the longitudinal direction of the vessel, or they may be azimuth thrusters that can provide propulsion in multiple directions. In a DP scenario, in order to maintain its balance against continual changes in position and angle of the vessel over time (e.g., to counteract wind, waves and current), the vessel may control its DP operation by activating one or more of the thruster control systems 110. It is to be appreciated that although two thrusters are shown in each thruster control system 110, embodiments of the invention are not limited to an specific number of thrusters included in a given thruster control system. Furthermore, embodiments of the invention are not limited to any specific number of thruster control systems 110 used in the hybrid power system 100.

In this illustrative embodiment, each bus segment 102, 104, 106 includes a thruster control system 110 coupled thereto. In one or more embodiments, each thruster in a given thruster control system is coupled to its bus segment by way of a corresponding switch (SW) which, like the switches connecting the plurality of bus segments 102, 104, 106, can be operated either automatically or manually. The switches allow each thruster, or other load component, to be disconnected from the power distribution grid in the event of a component failure.

Optionally, in one or more embodiments, each of at least a subset of the thrusters includes a voltage and/or frequency converter 112 (e.g., alternating current (AC)-to-AC converter), coupled in series between the thruster and the corresponding bus segment 102, 104, 106. The voltage and/or frequency converter 112 preferably functions to adapt the voltage on the bus segment to a voltage suitable for use by the thruster. For example, the voltage converter 112, in one or more embodiments, may comprise a transformer that may step down or step up the AC voltage of the power distribution grid to the operating voltage of the corresponding thruster, as appropriate. In other embodiments, the voltage and/or frequency converter 112 may function to control the motor by changing the frequency (e.g., revolutions per minute (RPM)) of the motor.

The hybrid power system 100 further includes a plurality of batteries 114, or other non-rotational energy storage elements (e.g., capacitors, etc.), coupled to the power distribution grid. In this illustrative embodiment, each of the batteries 114 is coupled to its own bus segment 102, 104, 106 by way of a switch, which, like the switches connecting the plurality of bus segments 102, 104, 106, can be operated either automatically, using an actuating device (not explicitly shown), or manually. Each of the batteries 114 includes a voltage converter 116 (e.g., direct current (DC)-to-AC converter), coupled in series between the battery and the corresponding bus segment 102, 104, 106. The voltage converter 116 functions to adapt the DC voltage provided by the battery into an AC voltage for power provision to the vessel, and in particular to the thrusters coupled with the corresponding bus segment.

Each of the bus segments 102, 104, 106 preferably has an independent power management system (PMS) 118 associated therewith. Each PMS 118 includes at least one controller 120 and one or more sensors 122 coupled with the controller, as well as a corresponding generator and related switchgear. The sensors 122 are configured to monitor the consumer load on the corresponding bus segment, as well as other conditions (e.g., battery 114 status). The controller 120 is configured to control one or more operational parameters of the integrated hybrid power system 100 as a function of information obtained from the sensors. Each controller 120 may, in one or more embodiments, include an interface (e.g., wired or wireless network interface) configured to communicate with respective controllers 120 in one or more other power management systems 118.

Although not explicitly shown, it is to be appreciated that each of at least a subset of the controllers 120, in one or more embodiments, may incorporate memory for storing certain data used by the power management system 118. Such data stored in the memory may include, but is not limited to, software which, when executed by a processor embedded in the controller, causes the controller to perform one or more actions used by the power management system 118 in implementing certain aspects of the invention. The memory of the controller 120 may also store certain output data obtained from the sensors 122 and used by the controller in implementing one or more features of the power management system 118.

In one or more embodiments, the power management systems 118 are coupled to an energy management system (EMS) 124. The network of power management systems 118, each having their own independent controllers 120 and sensors 122, essentially form a framework for the energy management system 124. The energy management system 124, in one or more embodiments, includes at least one processor 126 and memory 128 coupled with the processor for storing prescribed data associated with the processor. The memory may also be used to store software that, when downloaded and executed by the processor 126, causes the energy management system 124 to perform certain functions. Optionally, the energy management system 124 may also include an interface 130 configured to communicate with an operator using, for example, a wired or wireless communication network or the like. In this illustrative embodiment, the batteries 114 are included as part of the energy management system 124, although embodiments of the invention are contemplated wherein one or more of the batteries reside externally to the energy management system.

The energy management system 124 is preferably configured to supervise certain operations of the power management systems 118. For example, the energy management system 124 may control synchronization of the bus segments so that when two or more bus segments are synchronized, the respective power management systems 118 will operate in a master/slave configuration; preferably, only one power management system controller 120 is operative to perform an action(s) at a given time. Alternatively, when the bus segments are unsynchronized, the energy management system 124 preferably monitors the independent operation of the power management systems 118. With regard to master/slave operation, in one or more embodiments there is a dual network between the controllers 120 in the respective power management systems 118 to ensure redundancy. However, when the connection between bus segments is lost, the power management systems 118 will still be able to operate as independent entities.

It is to be appreciated that the power management systems 118, in one or more embodiments, will perform commands initiated by the energy management system 124 as long as prescribed operational limits of the integrated hybrid power system 100 are met. When such prescribed operational limits of the integrated hybrid power system 100 are not met, the power management systems 118 preferably operate under their own command; that is, the prescribed operational limits of the integrated hybrid power system 100 take precedence over actions requested by the energy management system 124. Accordingly, the energy management system 124 may be considered as performing secondary functions while the power management systems 118 may be considered as performing primary functions in the integrated hybrid power system 100.

Figure 2:
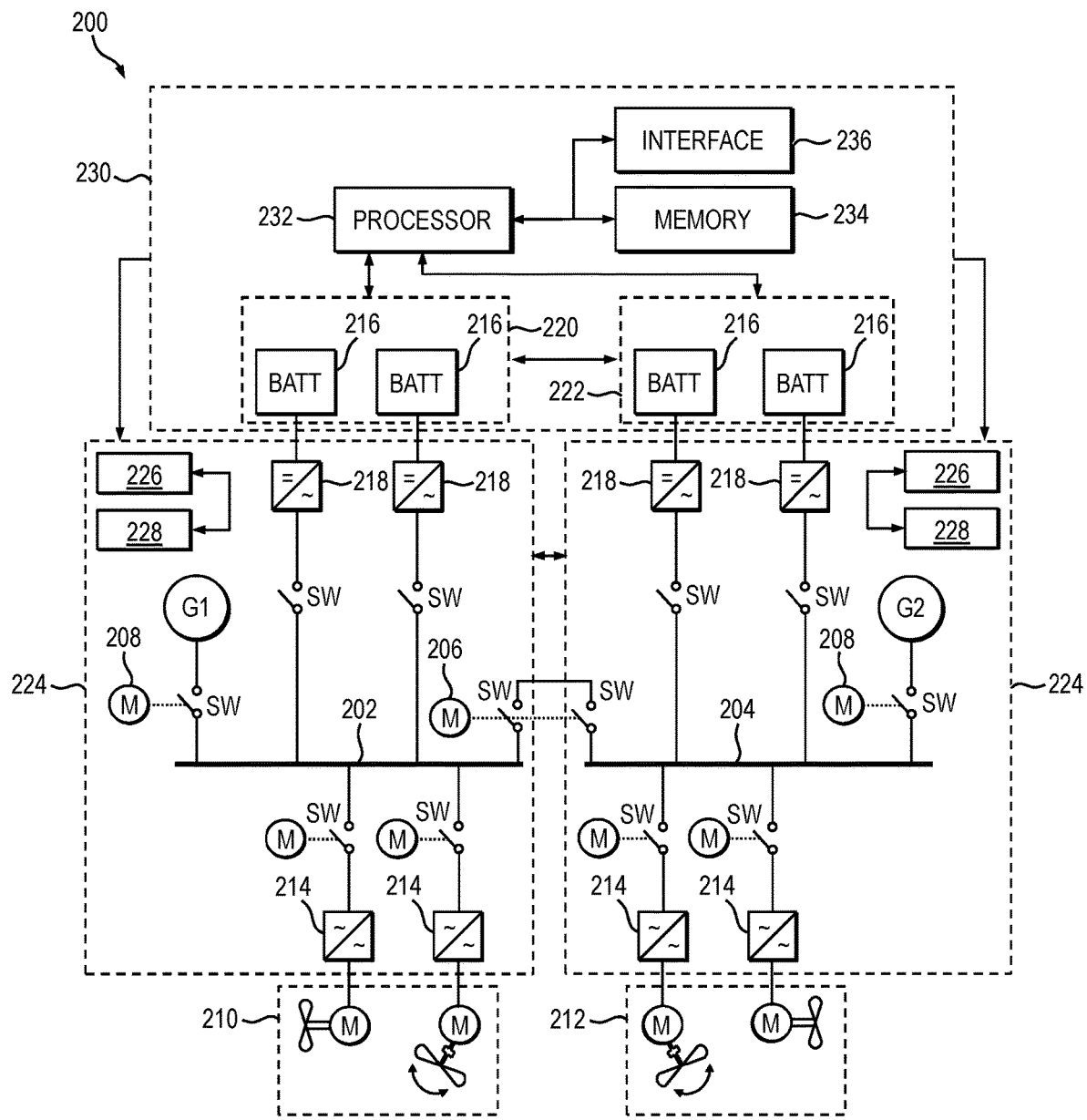
FIG. 2 is a block diagram depicting at least a portion of an exemplary fully integrated hybrid power system including two power bus segments, according to an embodiment of the present invention.

FIG. 2 is a block diagram depicting at least a portion of an exemplary fully integrated hybrid power system 200 including two power bus segments, according to an embodiment of the invention. The integrated hybrid power system 200 includes a power distribution grid comprising first and second power bus segments 202 and 204, respectively. Although two power bus segments 202, 204 are shown in this example for clarity, it is to be understood that embodiments of the invention are not limited to any specific number of power bus segments.

While there is no real limit to the number of power bus segments that may be used in the integrated hybrid power system 200, there is preferably a busbar breaker switch (SW) connected between each bus segment so that each bus segment can be selectively isolated from the power distribution grid to prevent a fault or failure on one bus segment from affecting the other bus segment(s). The breaker switch may be operated manually by a user, or, in one or more embodiments, automatically using a motor (M) 206 or other actuator mechanism.

The integrated hybrid power system 200 further includes first and second engine-driven power generators (i.e., gen sets), G1 and G2, respectively. Each generator G1, G2 is coupled to a corresponding bus segment 202, 204 by way of a breaker switch (SW) that is operated manually by a user, or, in one or more embodiments, automatically using a motor (M) 208 or other actuator mechanism. In this manner, each generator may be individually isolated from the power distribution grid in the event of a failure or for servicing, without affecting other components coupled with the power distribution grid.

The integrated hybrid power system 200 comprises a plurality of load components, more particularly thruster control systems 210 and 212, each thruster control system including a pair of thrusters, which may be implemented as a combination of a propeller or screw driven by a corresponding electric motor (M). The thrusters need not be the same type or serve the same function. For example, one pair of thrusters may function as main thrusters for the vessel while the other pair of thrusters may serve as bow thrusters, or auxiliary thrusters used for dynamic positioning or for redundancy. Preferably, each thruster control system 210, 212 comprises at least one azimuth thruster capable of providing propulsion in multiple directions.

Preferably, each thruster control system 210, 212 is coupled with a corresponding bus segment 202, 204. In one or more embodiments, each thruster in a given thruster control system 210, 212 is coupled to its bus segment by way of a corresponding breaker switch (SW) which, like the switches connecting the bus segments 202 and 204, can be operated either automatically or manually. The breaker switch allows each thruster to be separately disconnected from the power distribution grid in the event of a component failure or for servicing.

In one or more embodiments, each of at least a subset of the thrusters includes a voltage converter 214 (e.g., AC-to-AC converter) coupled in series between a given thruster and its corresponding bus segment 202, 204. The voltage converter 214 functions to adapt the voltage on the bus segment to a voltage suitable for use by the thruster. For example, the voltage converter 214, in one or more embodiments, may comprise a transformer that may step down or step up the AC voltage of the power distribution grid to the operating voltage of the corresponding thruster, as appropriate.

The integrated hybrid power system 200 further comprises a plurality of batteries 216, or other non-rotational energy storage elements (e.g., capacitors), coupled with the power distribution grid. In this illustrative embodiment, each of the bus segments 202, 204, has a pair of batteries 216 associated therewith, with each battery being coupled to a corresponding bus segment by way of a breaker switch (SW), which, like the breaker switches connecting the plurality of bus segments 202, 204, can be operated either automatically, using an actuating device (not explicitly shown), or manually. Each of the batteries 216 preferably includes a voltage converter 218 (e.g., DC-to-AC converter) coupled in series between the battery and the corresponding bus segment 202, 204. The voltage converter 218 functions to transform the DC voltage provided by the battery into an AC voltage for power provision to the vessel, and in particular to the thrusters or other load components coupled with the corresponding bus segment.

Each pair of batteries 216 associated with a given bus segment 202 or 204 preferably forms at least part of a battery management module, 220 or 222, respectively. Each battery management module 220, 222 may, in one or more embodiments, include one or more sensors (not explicitly shown, but implied) for monitoring the status of the batteries (e.g., charge level, etc.), as well as other conditions.

Each of the bus segments 202 and 204 preferably has an independent power management system (PMS) 224 associated therewith. In one or more embodiments, each power management system 224 includes at least one controller 226 and one or more sensors 228 coupled with the controller, as well as a corresponding engine-driven generator (e.g., G1, G2) and related switchgear (SW). The sensors 228 are preferably configured to monitor the consumer load on the corresponding bus segment, among other status conditions in the integrated hybrid power system 200 (e.g., battery 216 status, etc.). The controller 226 is configured to control one or more operational parameters of the integrated hybrid power system 200 as a function of information obtained from the sensors. Each controller 226 may, in one or more embodiments, include an interface (e.g., wired or wireless network interface) configured to communicate with respective controllers 226 in one or more other power management systems 224.

Although not explicitly shown, it is to be understood that each of at least a subset of the controllers 226, in one or more embodiments, may include memory for storing data used by the power management system 224. Such data stored in the memory may include, but is not limited to, software which, when executed by a processor embedded in the controller 226, causes the controller to perform one or more actions used by the power management system 224 in implementing certain aspects of the invention. The memory of the controller 226 may also store certain output data obtained from the sensors 228 and used by the controller in implementing one or more features of the power management system 224, and may further be configured to store historical data used, for example, in statistical analysis and prediction modelling, for example.

In one or more embodiments, the power management systems 224 associated with the bus segments 202, 204 are coupled to an energy management system (EMS) 230. The plurality of power management systems 224, each having their own independent controller 226 and sensor(s) 228, essentially form a framework for the energy management system 230. The energy management system 230, in one or more embodiments, includes at least one processor 232 and memory 234 coupled with the processor for storing prescribed data associated with the processor. The memory may also be used to store software that, when downloaded and executed by the processor 232, causes the energy management system 230 to perform prescribed functions. Optionally, the energy management system 230 may also include an interface 236 configured to communicate with an external device and/or an operator using, for example, a wired or wireless communication network or the like. In this illustrative embodiment, the batteries 216 are incorporated into the energy management system 230, although other embodiments are contemplated in which one or more of the batteries reside externally to the energy management system.

In one or more embodiments, the energy management system 230 is configured to monitor and/or control prescribed operations of the power management systems 224. For example, the energy management system 230 may control synchronization of the bus segments 202, 204 so that when the bus segments are synchronized, the respective power management systems 224 will operate in a master/slave configuration; preferably, only one power management system controller 226 is operative to perform an action(s) at a given time. Alternatively, when the bus segments are unsynchronized, the energy management system 230 preferably monitors the independent operation of the respective power management systems 224. With regard to master/slave operation, in one or more embodiments there is a dual network between the controllers 226 in the respective power management systems 224 to ensure redundancy. However, when the connection between bus segments is lost, the power management systems 224 will still be able to operate as independent entities.

In manner consistent with the exemplary integrated hybrid power system 100 shown in FIG. 1, the power management systems 224, in one or more embodiments, will perform commands initiated by the energy management system 230 as long as prescribed operational criteria of the integrated hybrid power system 200 are met. When such prescribed operational limits of the integrated hybrid power system 200 are not met, the power management systems 224 preferably operate under their own command; that is, the prescribed operational criteria of the integrated hybrid power system 200 will take precedence over actions requested by the energy management system 230. Accordingly, the energy management system 230 may be considered as performing secondary functions while the power management systems 224 may be considered as performing primary functions in the integrated hybrid power system 200.

In this illustration, each of the power management systems 224 also include the switches (SW) for connecting the power generation and load components (e.g., generators G1, G2, batteries 216 and thruster control systems 210 and 212) with the power distribution grid. Each of the control switches and other control elements (e.g., voltage converters 218) associated with a given power bus segment 202 and 204 are grouped as power management system sections 230 and 232, respectively, which are integrated with the power management system 228.

Preferably, at least a subset of the voltage converters 218 associated with the batteries 216 may be internally coupled together via a DC bus link, or other connection means. This arrangement allows the batteries 216 to be utilized as a bank of energy storage elements that are evenly loaded and charged, even when the bus segments 202, 204 are not synchronized at the power distribution grid; that is, the batteries 216 in one or more embodiments are charged and discharged as a single entity. In one or more embodiments, the DC link is configured to transfer power from one bus segment to another bus segment. The total loading capacity of the voltage converters 218 should be equal to or greater than one power generator, and therefore the size of the voltage converters, collectively, should be at least equal to the prescribed maximum rated power of one of the generators divided by the number of bus segments 202, 204 in the integrated hybrid power system 200.

The total storage capacity associated with the batteries 216, collectively, should be equal to at least about 70% of prescribed maximum rated power of the generator. This is due, at least in part, to a limited operational range of the batteries 216. More particularly, in one or more embodiments, the operational range of the batteries 216 is from about 20% charge to about 90% charge, which results in about 70% capacity available in normal operations. Thus, by way of example only, if the batteries are equal to 70% of the maximum rated power of the generator, the active capacity is about 49% (i.e., (100×0.7)×0.7=49%).

Compared to the integrated hybrid power system 100 shown in FIG. 1, the integrated hybrid power system 200 includes two batteries per bus segment, rather than a single battery per bus segment. This optional arrangement increases the redundancy and spinning reserve, as may be desired or required in certain applications, such as, for example, zero-emission operations. This configuration may be more suitable for vessels with predictable and predetermined operations that are to perform in a zero-emission operation, including, but not limited to, time-restricted DP operation, harbor operation and costal transits, where the batteries 216 can be replenished during transit to and from the operations. Furthermore, in one or more embodiments, the integrated hybrid power system 200 can be modified as a single bus segment configuration, adapted for vessels such as, for example, cargo vessels, ferries, fishing vessels, etc., as the system would still provide many of the benefits of the multiple bus segment system without the cost or complexity of a highly redundant versions shown in FIGS. 1 and 2.

Figure 3:
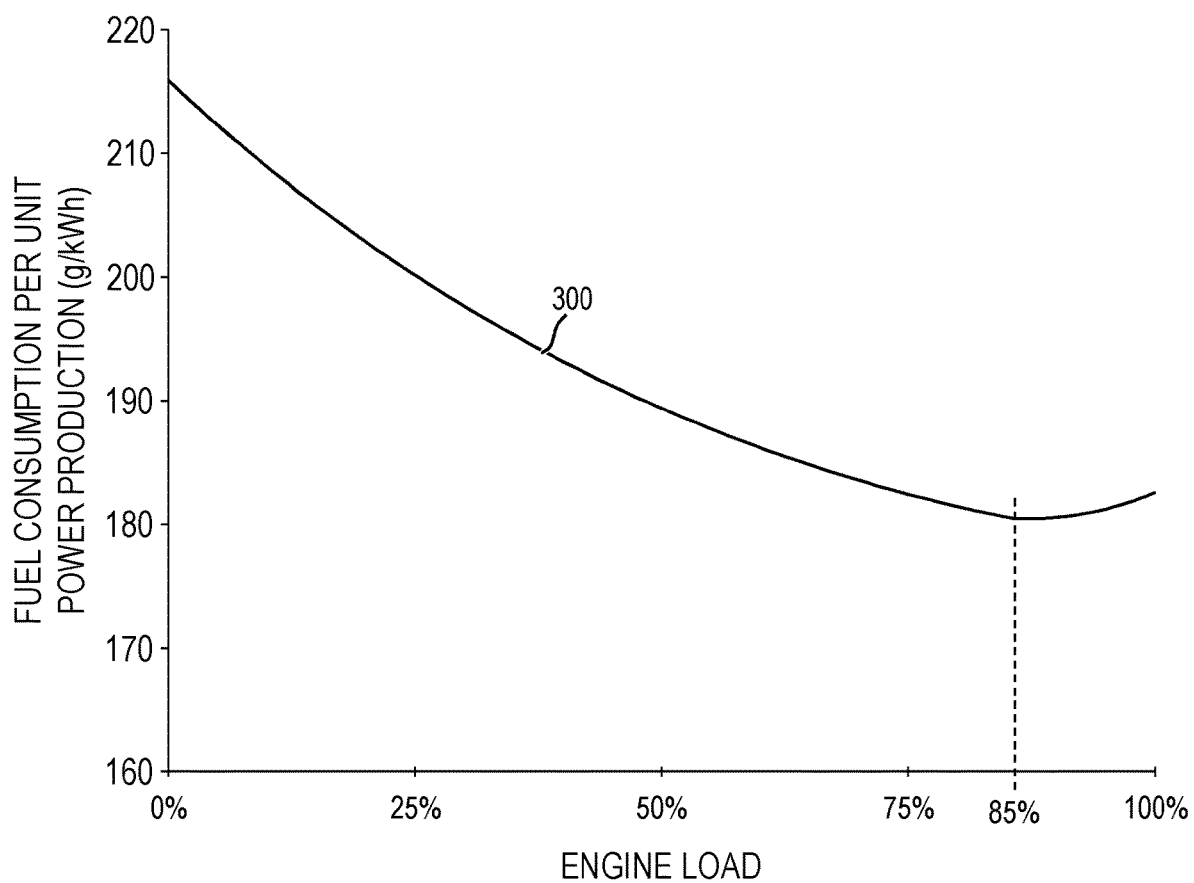
FIG. 3 is a fuel graph conceptually depicting an exemplary plot of fuel consumption per unit power production (in units of g/kWh) as a function of percentage engine load for a combustion engine which may be employed to drive a generator in the integrated hybrid power system.

In general, for a combustion engine, fuel consumption per unit power production, as measured, for example, in units of grams per kilowatt-hour (g/kWh), gradually decreases as the operating load on the engine increases. With reference to FIG. 3, a fuel graph depicts an exemplary plot 300 of fuel consumption per unit power production (in g/kWh) as a function of percentage engine load for a combustion engine which may be employed to drive a generator in the integrated hybrid power system 200. As apparent from FIG. 3, in order to optimize fuel efficiency of the engines driving the generators, each engine should be operated at a fairly constant load of about 85 percent. Above this loading amount, fuel consumption per unit power production begins to increase, although at a much lesser rate.

Thus, a maximum efficiency load is an operating load at a point where fuel efficiency in an engine driving a generator is optimal, and the fuel efficiency of the engine increases as the operating load of the engine approaches the maximum efficiency load. It is to be appreciated that engines may exhibit different fuel efficiency curves and thus different maximum efficiency load percentages, depending on one or more characteristics of the engine (e.g., engine size/rated output, manufacturer, combustion type, etc.) and/or engine operating environment (e.g., temperature, etc.), but the tendency for fuel efficiency in an engine to increase with increasing load will typically hold true.

With reference again to FIG. 2, in accordance with an aspect of the present invention, the integrated hybrid power system 200 is configured such that the engines driving the generators G1 and G2 are operated at their maximum efficiency loads (e.g., about 85%) regardless of fluctuations in consumer load over time, as measured on the power distribution grid. In order to accomplish this objective, one or more embodiments of the invention utilize the battery management modules 220, 222, as controlled by the controller 224 in the power management system 228, to cause the batteries 216 to supply power to the power distribution grid when consumer load is greater than the maximum efficiency load. Similarly, the battery management modules 220, 222, as controlled by the controller 224, cause the batteries 216 to load the power distribution grid when the consumer load is less than the maximum efficiency load. In this regard, the battery management modules 220, 222 are configured to provide the loading necessary to achieve the target maximum efficiency loading condition on the engines without requiring any additional consumer load. As such, the integrated hybrid power system 200 can provide the loading condition internally to charge the batteries 216, or the batteries can sustain the load until storage capacity in the batteries are sufficient to load a power generator. In this manner, the integrated hybrid power system 200 is configured to ensure that the generators are only operated at their optimal maximum efficiency loading, regardless of the external consumer loading.

Figure 4:
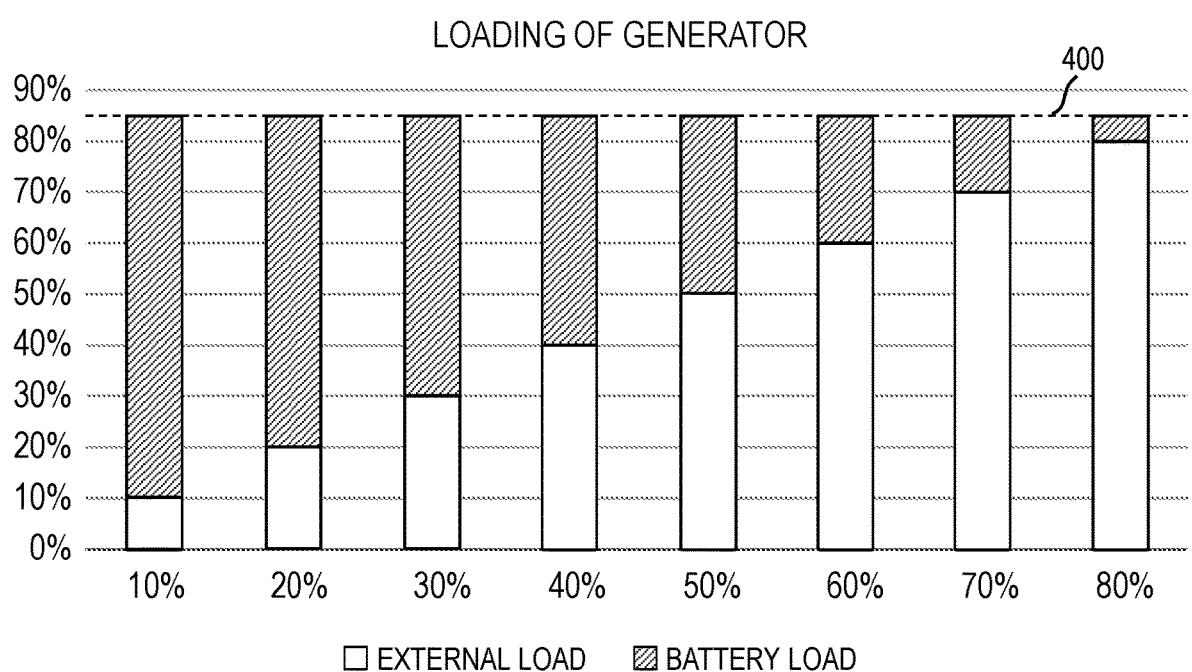
FIG. 4 is a graph conceptually depicting the loading of a given engine-driven generator in the illustrative integrated hybrid power system shown in FIG. 2, according to an embodiment of the present invention.

FIG. 4 is a graph conceptually depicting the loading of a given engine-driven generator in the illustrative integrated hybrid power system 200 shown in FIG. 2, according to an embodiment of the invention. As apparent from FIG. 4, the generator remains at a constant optimal maximum efficiency loading of about 85% despite variations in the external (i.e., consumer) loading percentage, as represented by line 400. For example, when the external loading on the generator is at 10%, the battery is configured to present a 75% load on the generator to make up the difference. Similarly, when the external loading on the generator is at 80%, the battery is configured to present only a 5% load on the generator.

According to one or more embodiments, the power management system 228 shown in FIG. 2 is configured such that it will not start a generator unless it can utilize the generator at a loading condition of at least its rated maximum efficiency, 85% in this example. Consequently, if the consumer (i.e., external) loading is less than the rated maximum efficiency loading (e.g., 85%) of the generator, the system will use stored power in the batteries to carry this load and turn off the generator to conserve fuel.

When there is less than 20% charge remaining in the batteries, the power management system 228 will start a generator to pick up the consumer load, and the additional loading will be used to charge the batteries. For example, when the consumer load is at 25% of the rating of a generator and there is less than 20% charge remaining in the battery, the power management system 228 will start one of the generators to supply power to the consumer load and the remaining 60% load will be diverted to charge the battery until the battery reaches a charge state of about 90%, and the cycle repeats.

Figure 5:
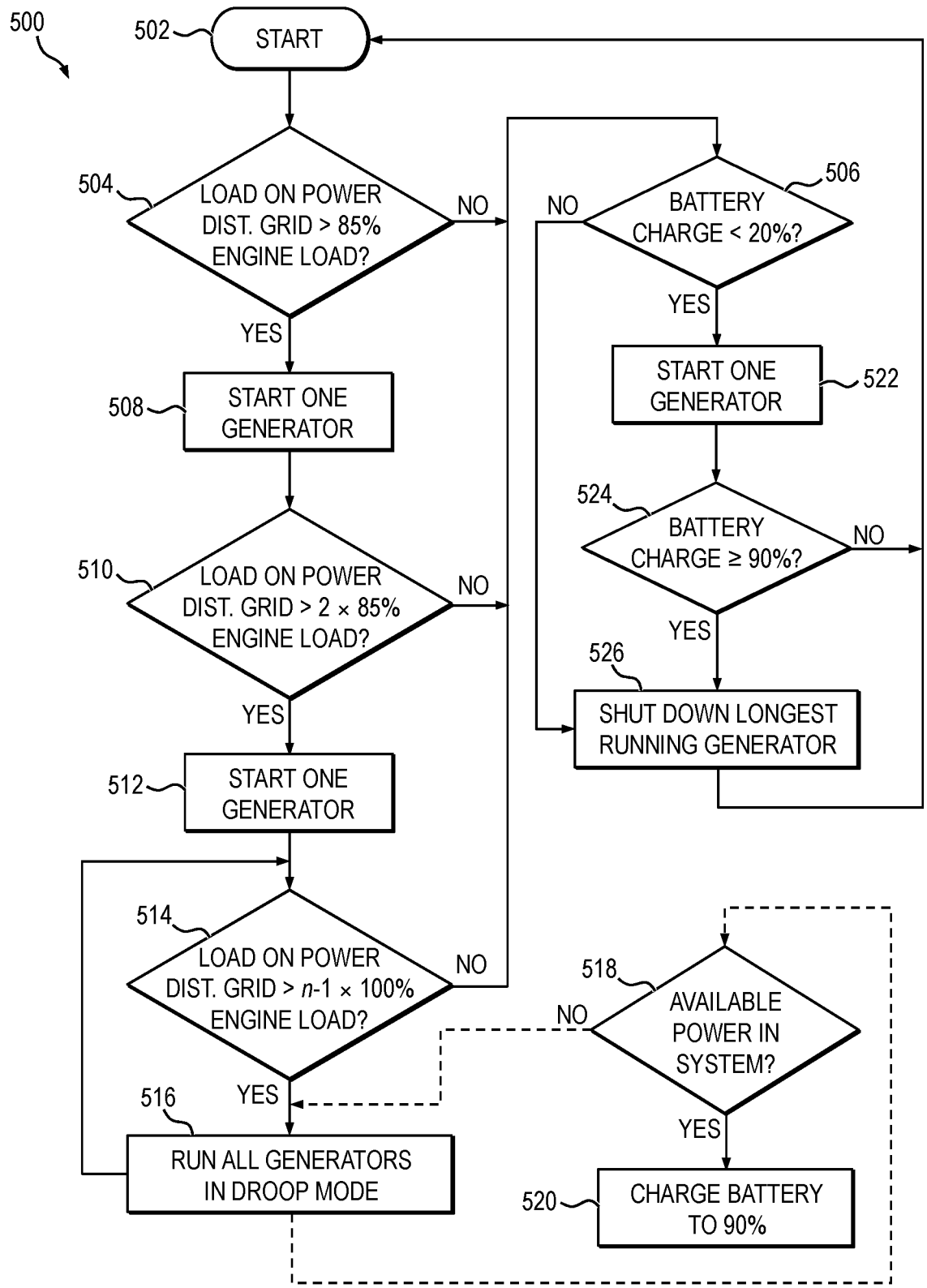
FIG. 5 is a process flow diagram depicting at least a portion of an exemplary method for maintaining a constant optimal efficiency loading on an engine-driven generator in a fully integrated hybrid power system, according to an embodiment of the present invention.

By way of example only and without limitation, FIG. 5 is a process flow diagram depicting at least a portion of an exemplary method 500 for maintaining a constant optimal maximum efficiency loading on an engine-driven generator in a fully integrated hybrid power system, according to an embodiment of the invention. One or more steps for performing the method 500 may be implemented, for example, in the controller 224 of the power management system 228, in conjunction with information obtained from the sensors 226, and/or in the battery management modules 220, 222, as shown in the illustrative fully integrated hybrid power system 200 of FIG. 2.

The method 500 begins at step 502 upon starting (i.e., powering up) the hybrid power system. The power management system 228 then determines whether the consumer load on the power distribution grid is greater than the prescribed rated maximum efficiency loading of the engine-driven generator (e.g., G1 or G2 in FIG. 2) in step 504. This step 504 can be implemented, for example, using the controller 224 to compare a load on the power distribution grid, as measured by one or more sensors 226, with a prescribed value for the rated maximum efficiency loading of the engine-driven generators (e.g., about 85%), which may be stored in memory either external or internal to the controller 224. As previously stated, the rated maximum efficiency loading will vary as a function of the engine used to drive the generator; that is, each engine will have its own characteristic plot of fuel consumption per unit power production, an example of which is shown in FIG. 3. However, the controller 224, in one or more embodiments, preferably utilizes a value which is representative of an average of the rated maximum efficiency loading of the generators.

When the load on the power distribution grid is not greater than the prescribed rated maximum efficiency loading of the engine-driven generators, the power management system 228 checks whether the battery charge level is less than a prescribed lower threshold value, such as, for example, 20%, in step 506. It is to be appreciated that embodiments of the invention are not limited to any specific lower threshold value(s) of the battery charge level. In one or more embodiments, the controller 224 obtains battery charge information from the battery management modules 220, 222, or the controller may obtain battery charge information from one or more sensors 226 in the power management system 228. Alternatively, when the load on the power distribution grid as determined in step 504 is greater than the prescribed rated maximum efficiency loading of the engine-driven generators, the power management system 228 starts one of the engine-driven generators in step 508.

The power management system 228 then checks whether the load on the power distribution grid is greater than twice the prescribed rated maximum efficiency loading of the engine-driven generators (e.g., 2×85%) in step 510. When the load on the power distribution grid is greater than twice the prescribed rated maximum efficiency loading of the engine-driven generators, the power management system 228 starts another one of the engine-driven generators in step 512, and then proceeds to step 514. Alternatively, when the load on the power distribution grid is not greater than twice the prescribed rated maximum efficiency loading of the engine-driven generators as determined in step 510, the method 500 proceeds to step 506, where the power management system 228 checks whether the battery charge level is less than the prescribed lower threshold value.

In step 514, the power management system 228 determines whether the load on the power distribution grid is greater than a load equal to the combined maximum rated output power of the total number of engine-driven generators minus one (i.e., n−1 generators, where n is the total number of generators in the system). When the load on the power distribution grid is not greater than this combined maximum rated output power of the total number of engine-driven generators minus one, the method 500 proceeds to step 506, where the power management system 228 checks whether the battery charge level is less than the prescribed lower threshold value.

Alternatively, when the load on the power distribution grid is greater than a load equal to the combined maximum rated output of the total number of generators minus one, as determined in step 514, the power management system 228 configures all engine-driven generators to run in droop mode in step 516. As will be known by those skilled in the art, droop control is a control strategy commonly applied to power generators for primary frequency control (and occasionally voltage control) to allow parallel generator operation (e.g., load sharing). The method 500 then returns to step 514 forming a feedback control loop, where the load on the power distribution grid is monitored (e.g., continuously, at prescribed time intervals, etc.). Thus, the method 500 will remain in droop mode (step 516), also referred to herein as heavy mode, until the system power demand returns to a load lower than a load equal to the combined maximum rated output of the total number of generators minus one, at which point step 514 changes the operating mode of the system to a normal mode, also referred to herein as primary mode, and proceeds to step 506.

Optionally, while the generators are running in droop mode in step 516, the power management system 228 checks to see whether there is available power in the integrated hybrid power system 200 in step 518. The functionality of step 518, which in one or more embodiments is a side operation that can be performed concurrently while the method 500 is in the droop mode loop (steps 514 and 516), can be accomplished, for example, by comparing the consumer load on the power distribution grid with the power being supplied by the generators and/or batteries. When there is available power in the system (i.e., when the power being generated is greater than the consumer load), as determined in step 518, the power management system 228 is configured to divert at least a portion of the residual power to charge the batteries in step 520 until the battery level is about equal to a prescribed upper charge threshold value (e.g., 90%) in order to ensure spinning reserve in the battery bank. The functionality performed in step 520 is conditional on either the batteries reaching the prescribed upper threshold or until the system mode changes from droop mode to normal mode (step 514), whichever comes first, at which point step 520 terminates.

If charging of the batteries was not stopped by the power management system 228 when the charge state of the batteries reaches this prescribed upper threshold of about 90%, the batteries would continue to accept excess power from the system (if available) until they were no longer able to do so. However, this approach is undesirable in that it would significantly affect the life expectancy of the batteries. The same holds true if the batteries were allowed to fall below the prescribed lower charge threshold of about 20%. In this scenario, assuming there was no additional power available on the power distribution grid, the batteries would continue to supply power to the system until they could no longer sustain the system voltage. Again, this approach would significantly affect the life expectancy of the batteries and is therefore undesirable.

As previously stated, when the load on the power distribution grid is less than the prescribed maximum efficiency load rating of the engine-driven generators, as determined in steps 504, 510 and 514, the power management system 228 checks whether the battery charge level is below the prescribed lower threshold value (e.g., about 20%) in step 506. When the battery charge level is below the prescribed lower threshold value, the power management system 228 starts one of the engine-driven generators in step 522 to pick up the consumer load, with the additional loading (e.g., above the prescribed rated maximum efficiency loading of the engine-driven generators) being used to charge the batteries. In step 524, the battery management module(s) 220, 222 determine whether the battery charge level has reached the prescribed upper threshold value (e.g., about 90%).

When the battery charge level has reached the prescribed upper threshold value as determined in step 524, the power management system 228 shuts down the longest running engine-driven generator in step 526, and the method 500 repeats by proceeding to step 502. In order to determine which of the engine-driven generators has been running the longest, the power management system 228, in one or more embodiments, preferably monitors an elapsed running time for each of the generators, and the generator having the greatest elapsed running time is selected for shut down. Alternatively, when it is determined in step 506 that the battery charge level is not less than the prescribed lower threshold value (e.g., about 20%), the power management system 228 shuts down the longest running engine-driven generator in step 526. The method 500 then repeats by returning to step 502.

Figure 6:
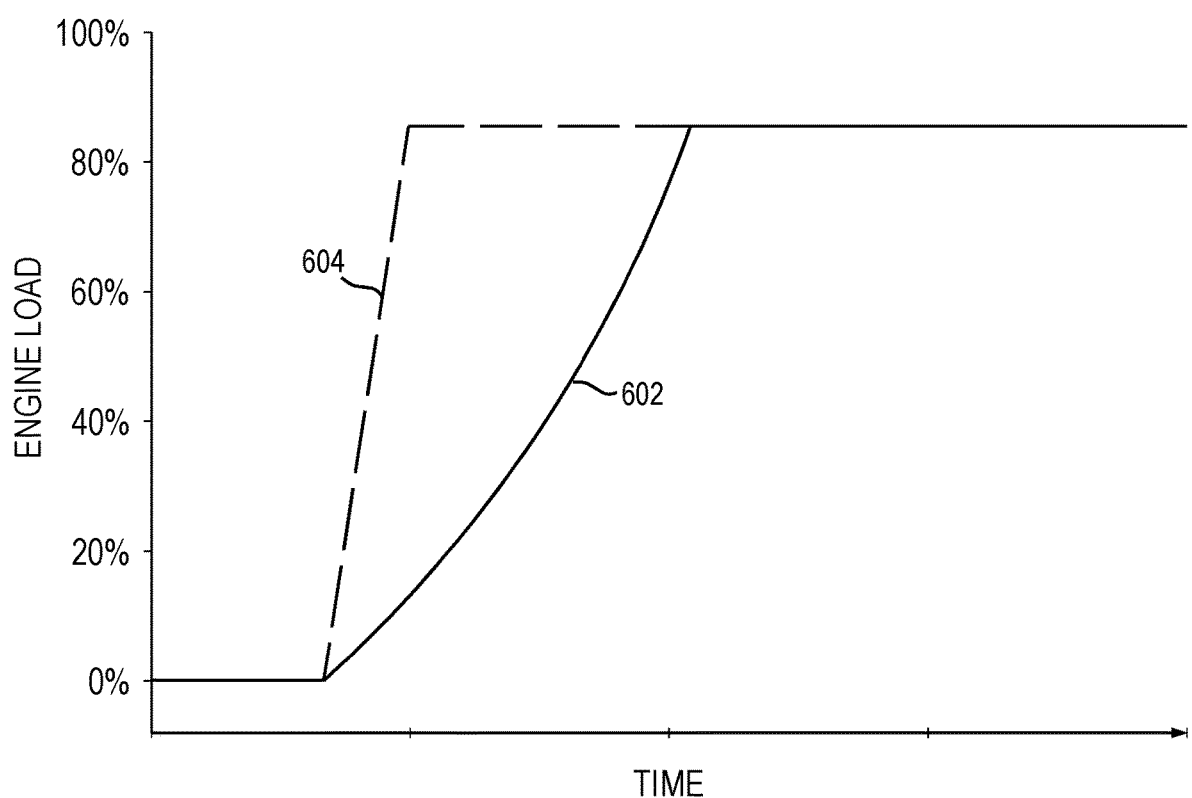
FIG. 6 is a graph conceptually depicting an exemplary gradual loading scheme for starting up a given engine-driven generator in the integrated hybrid power system, according to an embodiment of the present invention.

In accordance with one or more embodiments, when the power management system needs to start a generator, rather than just ramping up the generator to its prescribed rated maximum efficiency loading condition (e.g., 85%) as quickly as possible, the power management system will preferably gradually load the engine, such as through a generator control system or other means. FIG. 6 is a graph conceptually depicting an exemplary gradual loading scheme for starting up a given generator in the integrated hybrid power system (e.g., system 200 shown in FIG. 2), according to an embodiment of the invention. As apparent from FIG. 6, plot 602 shows a gradual loading of the generator over a prescribed period of time, as compared to a traditional generator start-up represented by plot 604; the plots are graphed as a function of arbitrary units of time. It is to be understood that the graph depicted in FIG. 6 is merely illustrative, and that embodiments of the invention are not limited to any specific amount of time for the generator to reach its prescribed optimal efficiency loading (e.g., 85%), as will become apparent to those skilled in the art given the teachings herein.

This is gradual start-up mode of operation of the engine-driven generator is beneficial, for example, to reduce strain and stress on the engine, as the integrated hybrid power system 200 will likely perform significantly more start-ups than a traditional power generation system. This gradual start-up mode of operation will apply to planned generator start-ups, since a default action by the power management system in response to an unforeseen or unplanned loss of a power generator will preferably be to start all available generators and bring them online as quickly as possible (thus following plot 604), and evenly load the generators until the integrated hybrid power system returns to normal operation.

When the integrated hybrid power system 200 desires to shut down an engine-driven generator, such as when method 500 enters step 526 after the batteries have reached their prescribed upper charge threshold (e.g., about 90%), rather than just de-synchronizing the generator at a high load and allowing it to idle in order to cool down, the power management system (e.g., 228 in FIG. 2), in one or more embodiments, runs the engine-driven generator at a reduced load to allow it to cool down, but the system still recovers some power production during this shut-down phase of operation. In this regard, it is generally preferably to run the engine at a low load for a prescribed minimum amount of time (e.g., about 10 minutes or so) to allow cooling of components, such as, for example, the turbo and exhaust manifold.

Figure 7:
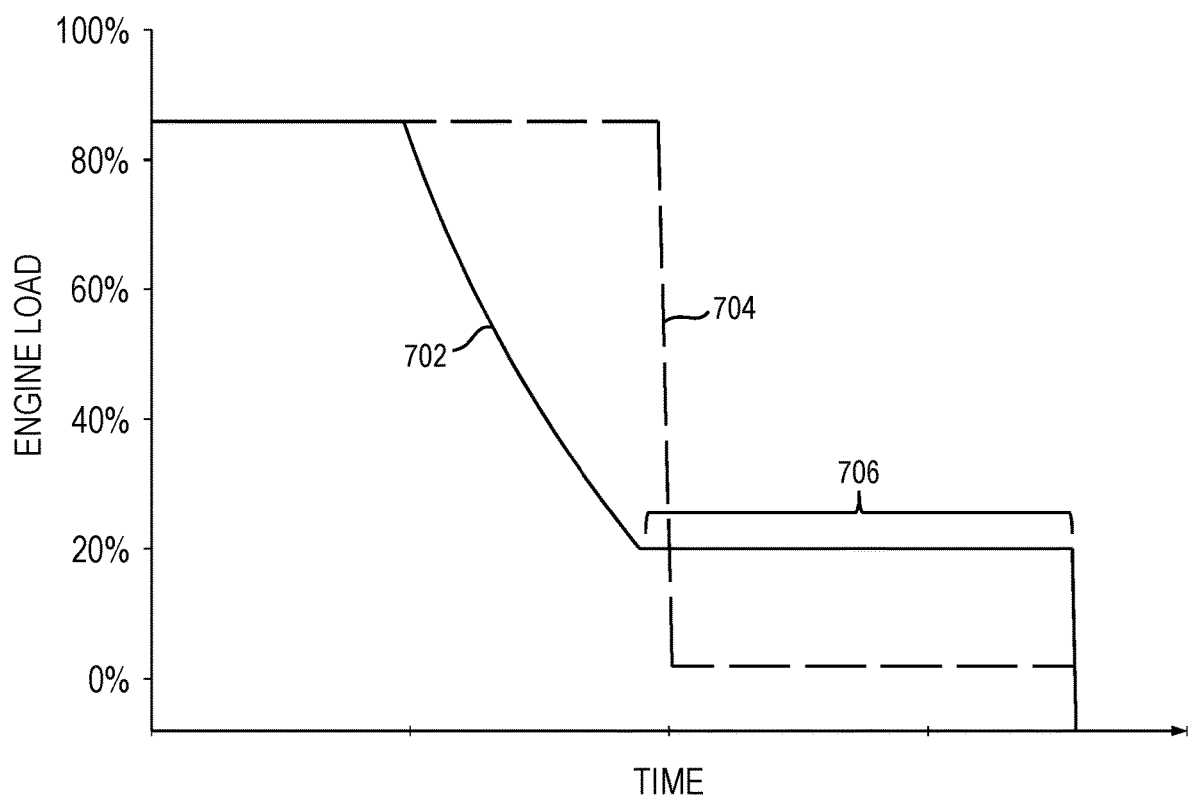
FIG. 7 is a graph conceptually depicting an exemplary scheme for shutting down a given engine-driven generator in the integrated hybrid power system, according to an embodiment of the present invention.

FIG. 7 is a graph conceptually depicting an exemplary scheme for shutting down a given engine-driven generator in the integrated hybrid power system (e.g., system 200 shown in FIG. 2), according to an embodiment of the invention. As apparent from FIG. 7, plot 702 shows a gradual reduction in loading of the generator over a prescribed period of time, as compared to a traditional generator shut-down represented by plot 704; the plots are graphed as a function of arbitrary units of time. In one or more embodiments, the power management system (e.g., 228 in FIG. 2) is configured to gradually reduce the load on the generator from its prescribed optimal efficiency loading (about 85% in this example) to a reduced load amount (e.g., about 20%) for a prescribed period of time 706 before turning off the engine.

In a load cycling mode of operation, the power management system (e.g., 228 in FIG. 2), in one or more embodiments, automatically selects an optimal configuration as a function of a current power load being supported. The power management system preferably runs one or more engine-driven power generators to supply the current load and uses the excess power to charge the batteries in a charging phase. That is, excess power to maintain the prescribed optimal efficiency loading of the generators will be diverted to the batteries. Once the batteries have reached their prescribed upper charge level threshold, the power management system shuts down a generator (preferably, the longest running generator, as previously described in conjunction with step 526 in FIG. 5), and the batteries will supply the necessary power to maintain the prescribed optimal efficiency loading of the remaining running generator(s).

Figure 8:
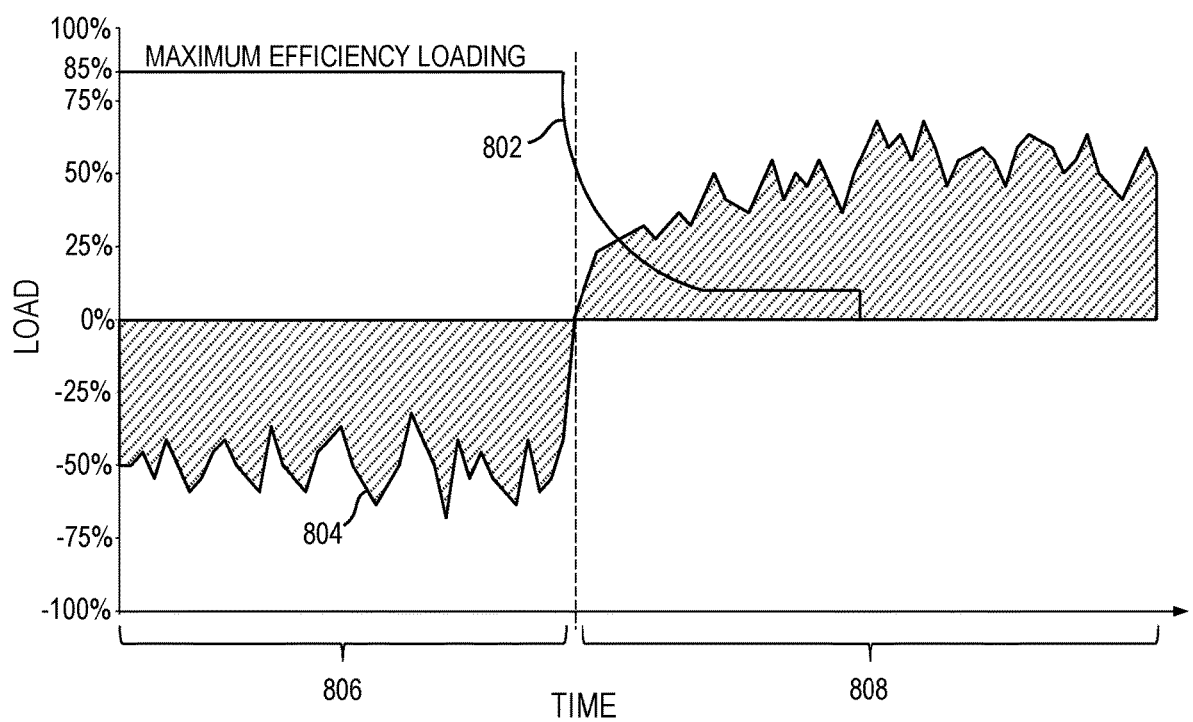
FIG. 8 is a graph conceptually depicting an exemplary load cycle of the fully integrated hybrid power system, according to an embodiment of the present invention.

More particularly, when the batteries can no longer accept any further power (i.e., the batteries have reached their prescribed upper charge threshold), a power generator will be shut down by the power management system and the batteries will supplement the deficiency in power production. Once the batteries have reached their prescribed lower charge threshold level (e.g., about 20%), a power generator will be started up and the cycle automatically repeats. FIG. 8 is a graph conceptually depicting an exemplary load cycle of the fully integrated hybrid power system, according to an embodiment of the invention. Specifically, the graph in FIG. 8 shows a general scenario in which the fully integrated hybrid system transitions from n generators running to n−1 generators running, where n is an integer greater than one. With reference to FIG. 8, plot 802 represents the loading on the engine-driven generator and plot 804 represents battery loading. During the time period 806 when n generators are running, the load on the engine remains at a constant maximum efficiency loading of 85%. During the time period 806, the battery will exhibit a negative engine load representing a charging phase of the battery. During the time period 808, the integrated hybrid system shuts down one of the generators (i.e., the system transitions from n running generators to n−1 running generators). During this period 808, the battery will exhibit a positive engine load, indicating that the battery is now supplying power to the system to pick up the load deficiency resulting from the dropped generator.

In one or more embodiments, the generators will be started and stopped in the same sequence, meaning that if generator G1 was the first to start running, followed by generator G2, then generator G1 will also be the first to be stopped, followed by generator G2, when called for by the power management system. In this manner, the amount of engine starts and stops will be evenly distributed across all the generators, as will the total running hours of the generators. This is advantageous for reducing generator downtime and enhancing overall system reliability.

In one or more embodiments, the method for maintaining a constant maximum efficiency loading on the engine-driven generator(s), an example of which was previously described in connection with FIG. 5, as well as other operational modes and/or features (e.g., generator start-up, generator shut-down, load cycling, etc.), are performed autonomously by the fully integrated hybrid power system based primarily on prediction data and secondary hard limits, among other factors. The term "prediction data" as used herein is intended to refer broadly to information regarding the loading or charging load in the bank of batteries. Using this data, the integrated hybrid system can predict a duration until a given loading condition is reached with an acceptable tolerance. The term "hard limits" as used herein is intended to refer broadly to the operational limits of the batteries or other system components, including, for example, loading conditions of the batteries and battery health. Thus, when the prediction data fails to start or stop an engine-driven generator before the operational limits of the batteries are reached, these operations will, nonetheless, be triggered by the hard limits designed into the integrated hybrid power system. Similarly, in the event that the internal cell temperature of a battery deviates from operational limits, the integrated hybrid power system will preferably automatically limit use of the battery until its temperature is within the prescribed operational limits. Since this condition is a variable outside the predictable scope of the methodology performed by the integrated hybrid power system, such actions, among other actions which ensure safe operation of system components, will be automatically triggered by the hard limits of the system.

With regard to operation of the integrated hybrid power system, the system preferably includes at least two operational modes. In a first mode of operation, which may be the primary mode, the integrated hybrid power system will cycle the engine-driven generators and maintain a loading on the generators at a constant maximum efficiency loading throughout the operation of the generators. In one or more embodiments, this first operational mode ranges from zero load on the power distribution grid to a load equal to the combined rated output of the total number of generators minus one (i.e., n−1 generators, where n is the total number of generators in the system). For loading above this range, the integrated hybrid power system enters into a second operational mode. In this second operational mode, which may be the heavy mode, the integrated hybrid power system is configured to utilize asymmetric loading, and all additional power is diverted to charge the batteries. This second mode beneficially assists in securing sufficient spinning reserve in the batteries.

The integrated hybrid power system preferably operates all essential auxiliary components autonomously. As the integrated hybrid power system, in one or more embodiments, needs to regularly (e.g., continuously or at prescribed intervals of time) determine the availability of each engine-driven generator (e.g., whether a given generator is off-line or on-line), the integrated hybrid power system may be configured to monitor the essential auxiliary components to ensure availability. This can be achieved, for instance, using one or more sensors (e.g., sensors 226 in FIG. 2) in the power management system (e.g., 228 in FIG. 2). In this manner, the integrated hybrid power system can beneficially identify potential issues prior to a configuration change, and determine alternative system configurations that will alleviate the potential problem. Optionally, the integrated hybrid power system is also able to reduce or stop unneeded auxiliary components from running, thereby conserving resources.

Figure 9:
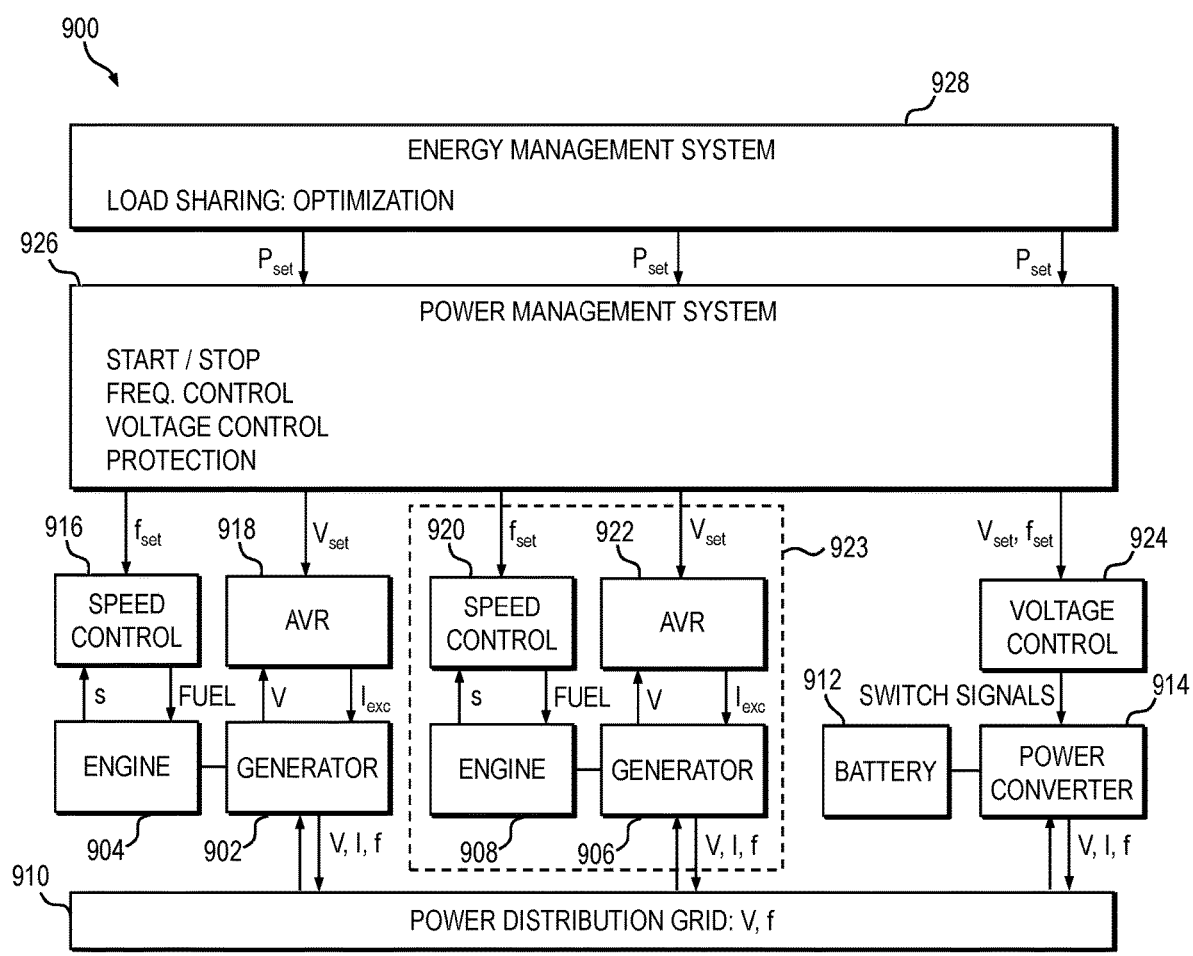
FIG. 9 is block diagram depicting at least a portion of an exemplary fully integrated hybrid system showing primary functional components of the system, according to an embodiment of the present invention.

FIG. 9 is top-level block diagram depicting at least a portion of an exemplary fully integrated hybrid system 900 showing primary functional components of the system, according to an embodiment of the invention. The integrated hybrid system 900 comprises at least a first generator 902 and first engine 904 driving the first generator, and, optionally, a second generator 906 and second engine 908 driving the second generator. The first and second generators 902, 906 are coupled with a power distribution grid 910, consistent with the power distribution grid including power bus segments 202 and 204 shown in FIG. 2. The integrated hybrid system 900 further includes a battery 912, or other energy storage element (e.g., capacitor), which is coupled with the power distribution grid 910 through a power converter 914. The battery 912, in one or more embodiments, preferably comprises a plurality of batteries that are selectively connected together to form a battery bank. The power converter 914, consistent with the voltage converters 218 shown in FIG. 2, preferably transform the DC voltage provided by the battery into an AC voltage having a prescribed amplitude and/or frequency for power provision to the power distribution grid 910.

A first engine speed controller 916 is coupled with the first engine 904 and a first automatic voltage regulator (AVR) 918 is coupled with the first generator 902. Likewise, a second engine speed controller 920 is coupled with the second engine 908 and a second AVR 922 is coupled with the second generator 906. Each of the engine speed controllers 916 and 920 is adapted to monitor a rotational (i.e., shaft) speed, s, of a corresponding engine 904 and 908, respectively, and to maintain a constant engine speed (e.g., in revolutions per minute (RPM)), based on a corresponding input frequency control signal, $f_{set}$, supplied to each of the engine speed controllers. In this manner, each engine speed controller 916, 920 functions to keep the frequency of an output supplied by the corresponding generator constant despite variations in load on the generator. Each of the AVRs 918 and 922 is adapted to monitor a voltage output by a corresponding generator 902 and 906, respectively, and to control a load on the generator, such as by varying an excitation current, $I_{exc}$, to maintain a constant load on the generator as a function of a corresponding voltage control signal, $V_{set}$, supplied to each of the AVRs. Similarly, a voltage controller 924 is coupled with the power converter 914 and is adapted to supply one or more switch signals for controlling a voltage and/or frequency of the output of the power converter as a function of voltage and frequency control signals supplied to the voltage controller.

The generator (902, 906), engine (904, 908), speed controller (916, 920) and AVR (918, 922) associated with a given power bus segment of the power distribution grid 910 forms a gen-set in the integrated hybrid power system 900. It is to be appreciated that in one or more embodiments, the second gen-set 923, which comprises second generator 906, second engine 908, second engine speed controller 920 and second AVR 922, may not be required and may therefore be omitted. The battery 912, power converter 914 and voltage controller 924 form a battery management system of the integrated hybrid power system 900. The gen-sets and battery management system together provide a primary control mechanism in the integrated hybrid power system 900.

The integrated hybrid power system 900 further comprises a power management system 926, which in one or more embodiment is consistent with the power management system 228 shown in FIG. 2. In one or more embodiments, the power management system 926, which provides a secondary control mechanism in the integrated hybrid power system 900, includes switches and corresponding actuating devices (e.g., switches SW shown in FIG. 2), sensors (e.g., 226 in FIG. 2) and at least one processor or other controller (224 in FIG. 2) configured to generate the one or more control signals (e.g., $f_{set}$, $V_{set}$) for controlling the gen-sets and battery management system. For example, the power management system 926 is adapted to control engine starting and stopping, generator output frequency, generator output voltage and system protection, as previously described. To accomplished this, the power management system 926 utilizes information obtained from the sensors (e.g., load on the power distribution grid, battery status, total output power supplied to the power distribution grid, etc.) to control the gen-sets and battery 912 as a function of one or more input control signals, such as, for example, power setpoint control signals, $P_{set}$, supplied to the power management system 926 by an energy management system 928 included in the integrated hybrid power system 900.

The energy management system 928 provide tertiary control over the gen-sets and battery management system and functions, at least in part, to implement the novel loading sharing methodologies for maintaining the engine-driven generators at a constant prescribed maximum efficiency loading (e.g., about 85%), as previously described in connection with FIG. 2. Although depicted in this example as a separate block external to the power management system 926, it is to be appreciated that one or more functions of the energy management system 928 may be integrated with the power management system. For instance, an optimization algorithm for maintaining the engine-driven generators at the constant prescribed maximum efficiency loading may be executed on at least one processor included in the power management system 926, according to one or more embodiments of the invention. Likewise, algorithms for providing a gradual engine start-up (e.g., described in conjunction with in FIG. 6), or for shutting down an engine using a gradual reduction in loading of the generator over a prescribed period of time (e.g., described in conjunction with FIG. 7), may be executed on the processor in the power management system 926, in one or more embodiments.

Aspects of the present invention are described herein with reference to flowchart illustrations and/or block diagrams of methods, apparatus (systems), and computer program products according to embodiments of the invention. It will be understood that each of at least a subset of functional blocks in the flowchart illustrations (e.g., FIG. 5) and/or block diagrams (e.g., FIGS. 1, 2 and 9), and combinations of blocks in the flowchart illustrations and/or block diagrams, may be implemented, by hardware, firmware, software (e.g., computer readable program instructions), or a combination of hardware, firmware and/or software, as will become apparent to those skilled in the art given the teachings herein.

The present invention may be a system, a method, and/or a computer program product. In one or more embodiments, the computer program product may include a non-transitory computer readable storage medium (or media) having computer readable program instructions thereon for causing a processor or other controller, such as, for example, the controller(s) 224 in the power management system 228, 230, 232 shown in FIG. 2, to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network (e.g., wireless LAN (WLAN)). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present invention.

The flowchart and block diagrams in the accompanying figures illustrate the architecture, functionality, and operation of possible implementations of systems, methods, and computer program products according to one or more embodiments of the invention. In this regard, each of at least a subset of the blocks in the block diagrams and/or flowchart illustration may represent a module, segment, or portion of instructions, which comprises one or more executable instructions for implementing the specified function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that in one or more embodiments, each of at least a subset of blocks in the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, to the extent that such terms are used herein, where an element is referred to as being "connected" or "coupled" to another element, it can be directly connected or coupled to the other element or intervening elements can be present. In contrast, when an element is referred to as being "directly connected" or "directly coupled" to another element, there are no intervening elements present. Furthermore, positional terms such as "above," "below," "upper" and "lower," when used, are intended to indicate relative positioning of elements or structures to each other as opposed to absolute position.

The illustrations of embodiments of the invention described herein are intended to provide a general understanding of the various embodiments, and they are not intended to serve as a complete description of all the elements and features of apparatus and systems that might make use of the structures and semiconductor fabrication methodologies described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the present invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the inven-

What is claimed is:

1. A method for achieving and maintaining constant energy efficiency in an integrated hybrid power system for a marine vessel, the integrated hybrid power system including a plurality of energy storage units and at least one power generator unit coupled with a power distribution grid, the method comprising:
   determining, by a power management system of the integrated hybrid power system, whether a consumer load on the power distribution grid is predicted to remain greater than a prescribed rated maximum efficiency loading of the at least one power generator;
   starting the at least one power generator when at least one of: (i) the consumer load on the power distribution grid remains greater than the prescribed rated maximum efficiency loading of the at least one power generator; and (ii) a charge level of the energy storage units is below a prescribed lower threshold value;
   maintaining, by the power management system, a substantially constant load on the at least one power generator equal to the prescribed rated maximum efficiency loading of the at least one power generator despite fluctuations in consumer load on the power distribution grid when the consumer load on the power distribution grid is greater than the prescribed rated maximum efficiency loading of the at least one power generator; and
   shutting down the at least one power generator when the consumer load on the power distribution grid is predicted to remain less than or equal to the prescribed rated maximum efficiency loading of the at least one power generator and the charge level of the energy storage units is greater than or equal to the prescribed lower threshold value;
   wherein the integrated hybrid power system includes a plurality of engine-driven power generators, the method further comprising:
   determining, by the power management system of the integrated hybrid power system, whether the load on the power distribution grid is greater than a combined maximum rated output power of the plurality of power generators minus one; and
   running the plurality of power generators in a droop mode when the load on the power distribution grid is greater than the combined maximum rated output power of the plurality of power generators minus one.

2. The method of claim 1, further comprising determining, by at least one sensor in the energy management system of the integrated hybrid power system, i-s integrated with the battery management system the individual cell charging level, cell temperature and health statute of battery cells.

3. The method of claim 1, wherein the integrated hybrid power system includes at least a second power generator source, the method further comprising starting the second power generator unit when the consumer load on the power distribution grid is predicted to be greater than twice the prescribed rated maximum efficiency loading of the at least one power generator.

4. The method of claim 1, further comprising:
   determining whether the charge level of the energy storage units is below the prescribed lower threshold value when the load on the power distribution grid is less than or equal to the combined maximum rated output power of the plurality of power generators minus one; and
   starting a second one of the power generators when the charge level of the energy storage units is below the prescribed lower threshold value.

5. The method of claim 4, further comprising, when the load on the power distribution grid is less than or equal to the combined maximum rated output power of the plurality of power generators minus one, shutting down a longest running one of the plurality of power generators when the charge level of the energy storage units is greater than or equal to the prescribed lower threshold value.

6. The method of claim 5, further comprising, when at least two power generators are running and the load on the power distribution grid is less than or equal to the combined maximum rated output power of the plurality of power generators minus one, shutting down the longest running one of the plurality of power generators when the charge level of the energy storage units is greater than or equal to a prescribed upper threshold value.

7. The method of claim 1, wherein while the plurality of power generators are running in the droop mode, the method further comprises:
   determining whether there is available power in the integrated hybrid power system; and
   diverting at least a portion of the available power to charge the energy storage units until the charge level of the energy storage units is about equal to a prescribed upper threshold value.

8. The method of claim 1, wherein starting the at least one power generator comprises increasing the energy out take of at least one power generator over a prescribed period of time.

9. The method of claim 1, wherein shutting down the at least one power generator comprises reducing the energy loading on the at least power generator from the prescribed rated maximum efficiency loading to a prescribed reduced load amount for a prescribed period of time before turning off the at least one power generator.

10. The method of claim 1, wherein the prescribed rated maximum efficiency loading is about 85 percent a diesel fuel engine, 95 to 100 percent for gas fueled engines and 70 percent for hot fuel cell power generator unit.

11. The method of claim 1, further comprising maintaining the charge level of the energy storage units between about 20 percent and about 90 percent.

12. An energy management system for use in an integrated hybrid power system for a marine vessel, the integrated hybrid power system including a plurality of energy storage units and at least one power generator unit coupled with a power distribution grid, the energy management system comprising:
   memory; and
   at least one processor coupled with the memory and the plurality of energy storage units, the processor being configured:
      to determine whether a consumer load on the power distribution grid is predicted to remain greater than a prescribed rated maximum efficiency loading of the at least one power generator;
      to start the at least one power generator when at least one of: (i) the consumer load on the power distribution grid is greater than the prescribed rated maximum efficiency loading of the at least one power generator; and (ii) a charge level of the energy storage units is below a prescribed lower threshold value;

to maintain a substantially constant load on the at least one power generator equal to the prescribed rated maximum efficiency loading of the at least one power generator despite fluctuations in consumer load on the power distribution grid when the consumer load on the power distribution grid is greater than the prescribed rated maximum efficiency loading of the at least one power generator; and to shut down the at least one power generator when the consumer load on the power distribution grid is less than or equal to the prescribed rated maximum efficiency loading of the at least one power generator and the charge level of the energy storage units is greater than or equal to the prescribed lower threshold value;

wherein the integrated hybrid power system includes a plurality of engine-driven power generators, and wherein the at least one processor is configured:

to determine whether the load on the power distribution grid is greater than a combined maximum rated output power of the plurality of power generators minus one; and to run the plurality of power generators in a droop mode when the load on the power distribution grid is greater than the combined maximum rated output power of the plurality of power generators minus one.

13. The energy management system of claim 12, further including at least one sensor coupled with the at least one processor, wherein the at least one processor is configured to determine, using information obtained from the at least one sensor, the charge level of the energy storage units.

14. The energy management system of claim 1, wherein the at least one processor is configured:

to determine whether the charge level of the energy storage units is below the prescribed lower threshold value when the load on the power distribution grid is less than or equal to the combined maximum rated output power of the plurality of power generators minus one; and to start a second one of the power generators when the charge level of the energy storage units is below the prescribed lower threshold value.

15. The energy management system of claim 14, wherein when the load on the power distribution grid is less than or equal to the combined maximum rated output power of the plurality of power generators minus one, the at least one processor is configured to shut down a longest running one of the plurality of power generators when the charge level of the energy storage units is greater than or equal to the prescribed lower threshold value.

16. The energy management system of claim 15, wherein when at least two power generators are running and the load on the power distribution grid is less than or equal to the combined maximum rated output power of the plurality of power generators minus one, the at least one processor is configured to shut down the longest running one of the plurality of power generators when the charge level of the energy storage units is greater than or equal to a prescribed upper threshold value.

17. The energy management system of claim 12, wherein while the plurality of power generators are running in the droop mode, the at least one processor is configured:

to determine whether there is available power in the integrated hybrid power system; and to divert at least a portion of the available power to charge the energy storage units until the charge level of the energy storage units is about equal to a prescribed upper threshold value.

18. The energy management system of claim 12, wherein in starting the at least one power generator, the at least one processor is configured to load the at least one power generator over a prescribed period of time.

19. The energy management system of claim 12, wherein in shutting down the at least one power generator, the at least one processor is configured to reduce a load on the at least power generator from the prescribed rated maximum efficiency loading to a prescribed reduced load amount for a prescribed period of time before turning off the at least one power generator.

* * * * *